(12) United States Patent
Venter et al.

(10) Patent No.: US 12,036,744 B2
(45) Date of Patent: Jul. 16, 2024

(54) ANVIL AND SPIGOT ARRANGEMENT FOR CAP APPLICATOR UNIT

(71) Applicant: Elopak GmbH, Speyer (DE)

(72) Inventors: Gert Venter, Juchen (DE); Heidrun Franz, Monchengladbach (DE)

(73) Assignee: Elopak GmbH, Speyer (DE)

( * ) Notice: Subject to any disclaimer, the term of this patent is extended or adjusted under 35 U.S.C. 154(b) by 904 days.

(21) Appl. No.: 16/966,022

(22) PCT Filed: Jan. 21, 2019

(86) PCT No.: PCT/EP2019/051366
§ 371 (c)(1),
(2) Date: Jul. 30, 2020

(87) PCT Pub. No.: WO2019/149556
PCT Pub. Date: Aug. 8, 2019

(65) Prior Publication Data
US 2020/0353692 A1    Nov. 12, 2020

(30) Foreign Application Priority Data

Feb. 1, 2018   (GB) ..................... 1801624

(51) Int. Cl.
| | |
|---|---|
| *B29C 65/08* | (2006.01) |
| *B29C 65/00* | (2006.01) |
| *B29C 65/78* | (2006.01) |
| *B31B 50/84* | (2017.01) |
| *B65B 61/18* | (2006.01) |
| *B29L 31/00* | (2006.01) |

(52) U.S. Cl.
CPC .......... *B29C 65/08* (2013.01); *B29C 65/7847* (2013.01); *B29C 66/112* (2013.01);
(Continued)

(58) Field of Classification Search
CPC ..... B31B 50/84; B65B 61/186; B65B 51/225; B29C 66/61; B29C 66/63; B29C 66/8145;
(Continued)

(56) References Cited

U.S. PATENT DOCUMENTS

| | | | |
|---|---|---|---|
| 4,075,820 A | | 2/1978 | Standley |
| 5,484,374 A | * | 1/1996 | Bachner ................. B29C 66/63 |
| | | | 493/12 |

(Continued)

FOREIGN PATENT DOCUMENTS

| | | |
|---|---|---|
| CN | 101754901 | 6/2010 |
| MX | 145504 A | 2/1982 |

(Continued)

OTHER PUBLICATIONS

Translated Search Report and Written Opinion for Chinese Application CN 201980011277.5 dated Aug. 27, 2021.

*Primary Examiner* — Joshua G Kotis
(74) *Attorney, Agent, or Firm* — Christian D. Abel (57) ABSTRACT

Apparatus (10) is for use in a cap applicator unit (12). The apparatus (10) comprises a spigot (14) comprising an elongate body (16) and a head (18) connected to one end of the elongate body (16), and an anvil (20) provided with a hole (22) therein, the elongate body (16) of the spigot (14) mounted in the hole (22) of the anvil (20). The size of the hole (22) of the anvil (20) is sufficiently greater than the size of the elongate body (16) of the spigot (14) to permit angular movement of the spigot (14) relative to the anvil (20). The apparatus (10) further comprises at least one tensioning device (24) and (36) arranged to provide a force tensioning the spigot (14) against the anvil (20).

9 Claims, 13 Drawing Sheets

(52) U.S. Cl.
CPC ...... *B29C 66/131* (2013.01); *B29C 66/53247* (2013.01); *B29C 66/61* (2013.01); *B29C 66/63* (2013.01); *B29C 66/72328* (2013.01); *B29C 66/7392* (2013.01); *B29C 66/8145* (2013.01); *B29C 66/81463* (2013.01); *B29C 66/81611* (2013.01); *B29C 66/8163* (2013.01); *B29C 66/8322* (2013.01); *B29C 66/849* (2013.01); *B31B 50/84* (2017.08); *B65B 61/186* (2013.01); *B29L 2031/7166* (2013.01)

(58) Field of Classification Search
CPC ......... B29C 66/81463; B29C 66/81611; B29C 66/8163
See application file for complete search history.

(56) References Cited

U.S. PATENT DOCUMENTS

| | | | | |
|---|---|---|---|---|
| 5,964,688 | A * | 10/1999 | Woody | B29C 65/222 493/207 |
| 6,019,154 | A * | 2/2000 | Ma | B29C 66/8163 156/581 |
| 7,568,607 | B2 * | 8/2009 | Adler | B29C 66/112 156/580.2 |
| 7,950,208 | B2 * | 5/2011 | Mancin | B29C 66/92431 53/329.2 |
| 2002/0103064 | A1 * | 8/2002 | Kondo | B29C 66/131 493/70 |
| 2010/0004108 | A1 * | 1/2010 | Abrahamsen | B29C 66/112 53/133.2 |
| 2010/0115885 | A1 | 5/2010 | Andersen | |
| 2011/0214392 | A1 * | 9/2011 | Niven | B29C 66/61 53/375.9 |
| 2017/0197741 | A1 * | 7/2017 | Carvin | B65B 3/04 |

FOREIGN PATENT DOCUMENTS

| | | | | |
|---|---|---|---|---|
| WO | WO-2008136683 | A1 * | 11/2008 | ............ B29C 65/08 |
| WO | WO-2010029308 | A1 * | 3/2010 | ............ B29C 65/08 |

* cited by examiner

ANVIL AND SPIGOT ARRANGEMENT FOR CAP APPLICATOR UNIT

This invention relates to apparatus for use in a cap applicator unit and to a method of operating the apparatus.

Cap applicator units are used in liquid food packaging to add a screw cap arrangement (also called a pour spout fitment) to a partially formed container. For example juice cartons are commonly provided with a screw cap arrangement that allows an end user to easily access the contents of the carton by unscrewing the cap and then easily and securely reseal the carton by closing the screw cap. Cartons are often formed from flat blanks of plastics-coated paperboard, which are folded and then side sealed to form a sleeve of material. This sleeve is then fed to a form-fill-seal machine which turns the sleeve into a finished carton.

If a screw cap arrangement is required for the carton then this is usually provided in one of two ways. The first method is to apply the screw cap arrangement externally to the carton, where the user, when they first open the screw cap, cause a cutter to pierce and break open the paperboard substrate. The second method is for a hole to be provided in the paperboard, where the screw cap arrangement is fitted through the hole from the inside while the top of the partially formed carton is still open, which is then sealed to the partially formed carton in the same operation.

In this latter method, an anvil and spigot are commonly used, with the spigot being fixed to the anvil. A screw cap arrangement is mounted onto the spigot, the anvil is then lowered into the top of the partially formed carton and moved forward so that the screw cap arrangement is located through the hole in the partially formed carton with a flange of the screw cap arrangement being retained on the inside of the partially formed container. An ultrasonic horn is then brought into contact with the screw cap arrangement and sealing is provided while the anvil and horn provide pressure on screw cap arrangement as part of the sealing operation.

A known problem with such anvil, spigot and horn arrangements is that the tolerances of the equipment have to be very high, as the anvil and the horn must be in an exact alignment when they are brought together to achieve the necessary seal. This requires a high level of technical skill by an engineer when the cap applicator unit is originally configured and also requires constant maintenance of the unit to ensure that the alignment of the components is maintained.

The nature of the cap applicator unit is also such that a very high level of throughput is required, with the cap applicator stage generally taking less than a second. Since the anvil is lowered into the interior of the partially formed container and the horn applies a direct pressure onto the anvil (with the carton and screw cap arrangement in-between) this has the tendency to deform the anvil arm very slightly over a long period of time. Even a deviation of less than 1 degrees in the alignment of the anvil and the horn is sufficient to result in a seal of the screw cap that is not good enough for a food product. Either leakage will occur or the contents of the carton will spoil.

It is therefore an object of the invention to improve upon the known art.

According to a first aspect of the present invention, there is provided apparatus for use in a cap applicator unit, the apparatus comprising a spigot comprising an elongate body and a head connected to one end of the elongate body, and an anvil provided with a hole therein, the elongate body of the spigot mounted in the hole of the anvil, wherein the size of the hole of the anvil is sufficiently greater than the size of the elongate body of the spigot to permit angular movement of the spigot relative to the anvil and the apparatus further comprises at least one tensioning device arranged to provide a force tensioning the spigot against the anvil.

According to a second aspect of the present invention, there is provided a method of operating apparatus for use in a cap applicator unit, the apparatus comprising a spigot comprising an elongate body and a head connected to one end of the elongate body, and an anvil provided with a hole therein, the elongate body of the spigot mounted in the hole of the anvil, wherein the size of the hole of the anvil is sufficiently greater than the size of the elongate body of the spigot to permit angular movement of the spigot relative to the anvil and the apparatus further comprises at least one tensioning device arranged to provide a force tensioning the spigot against the anvil, the method comprising locating a screw cap arrangement adjacent to a partially formed container, locating the anvil adjacent to the screw cap arrangement, and applying pressure from a horn onto the screw cap arrangement and the partially formed container to seal the screw cap arrangement to the partially formed container, whereby the spigot moves angularly relative to the anvil so that the head of the spigot is in alignment with the horn.

Owing to the invention, it is possible to provide an improved anvil and spigot arrangement for use in a cap applicator unit that will provide a sufficiently good seal while having a much improved tolerance of a misalignment between the anvil and the sealing horn. This means that the initial set-up of the anvil and spigot does not have to be as accurate and also that the requirement for maintenance of the anvil and spigot is reduced. The spigot is essentially "floating" in the anvil and this means that when the anvil is brought into contact with the sealing horn a certain amount of self-correction of any misalignment will occur automatically.

The improved anvil and spigot arrangement provide the automatic correction of any misalignment because the hole in the anvil through which the spigot is located is sufficiently greater than the size of the elongate body of the spigot to permit angular movement of the spigot relative to the anvil. The permitted angular movement may be very small, for example only up to 2 degrees, but this range of movement is sufficient to provide the necessary level of correction needed to compensate for any misalignment. The tensioning device tensions the spigot against the anvil (either by acting directly on each component or through other intermediate components) and this ensures that the spigot, in its starting position will be aligned with the anvil.

Once the arrangement is in actual operation, the pressure provided by the horn and anvil will mean that if there is any misalignment between the horn and the anvil the pressure forcing the two components together will cause the spigot to move within the anvil to correct that misalignment. The pressure exerted by the horn and anvil overcomes the force of the tensioning device which is holding the spigot in alignment with the anvil and the spigot will therefore be in alignment with the horn, ensuring that a good seal is achieved by the screw cap arrangement onto the carton onto which is being sealed in the cap applicator unit.

Preferably, the anvil is further provided with a cavity connected to and in longitudinal alignment with the hole in the anvil, the cavity containing the tensioning device. Also preferably the apparatus further comprises a locking ring mounted on the elongate body of the spigot at the opposite end of the elongate body to the head of the spigot, wherein the tensioning device is arranged to provide its tensioning force through the locking ring. The tensioning device, such as a spring, can be located within a cavity within the anvil and a locking ring can mounted on the opposite end of the spigot to the head of the spigot. The locking ring can be tightened so as to compress the tensioning device in order to create the required tension between the spigot and the anvil, which maintains them in alignment.

Embodiments of the present invention will now be described, by way of example only, with reference to the accompanying drawings, in which:—

Figure 1:
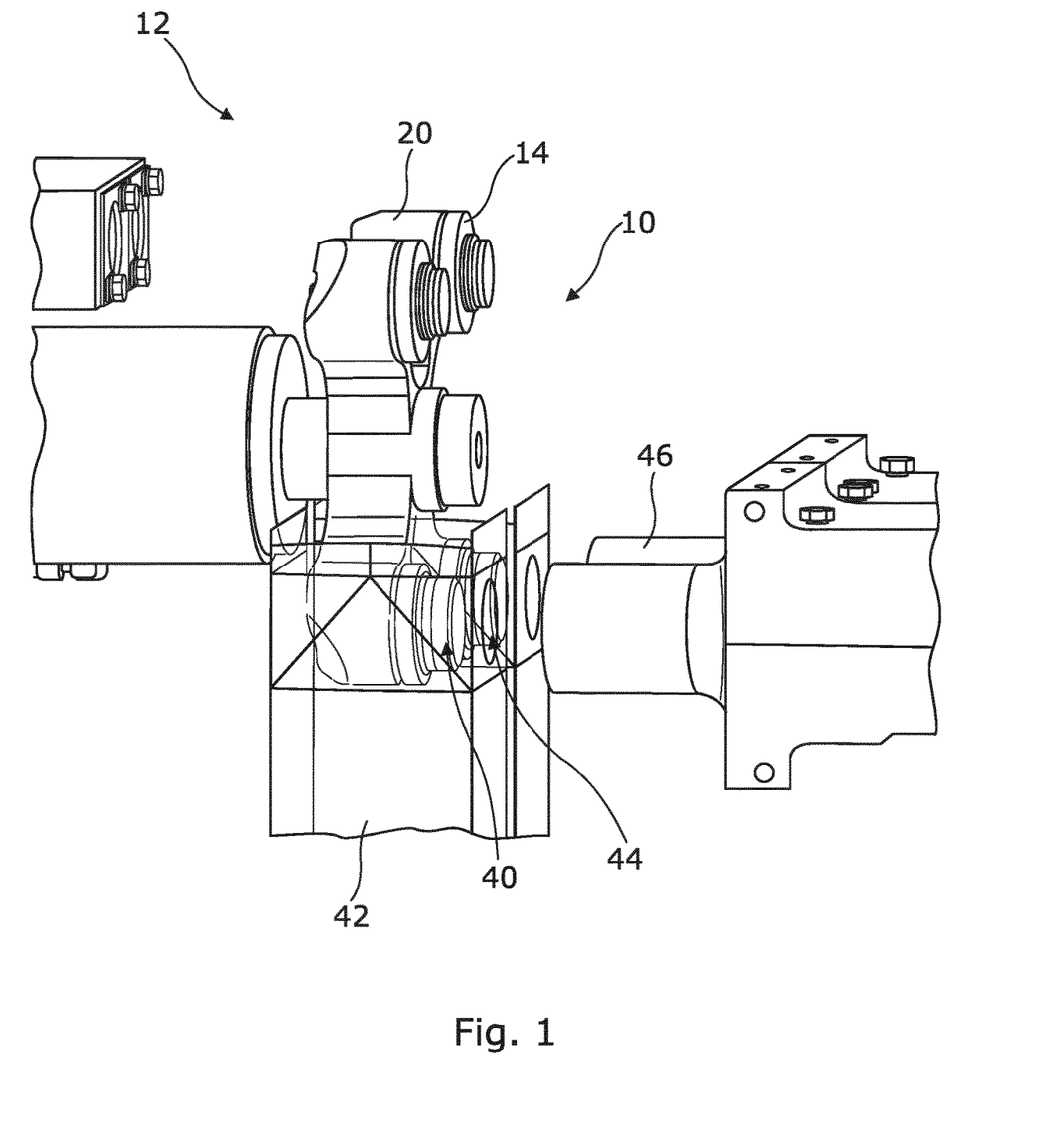
FIG. 1 is a perspective view of a cap applicator unit.

FIG. 1 shows apparatus 10 for use in a cap applicator unit 12. The purpose of the unit 12 is to apply a screw cap arrangement 40 to a partially formed container 42, through a hole 44 in the partially formed container 42 (from the inside). The unit 12 shown in FIG. 1 is a double indexing machine, which means that two partially formed containers 42 are fitted with the screw cap arrangements 40 at the same time. The main components of the unit 12 are an anvil 20 which carries four spigots 14 and an ultrasonic horn 46, which welds the screw cap arrangements 40 to the partially formed containers 42. The unit 12 in this preferred embodiment has four spigots 14 and is double indexing, but other arrangements are possible, for example with one, two or eight spigots 14 and being single indexing rather than double indexing.

Two screw cap arrangements 40 are loaded onto two of the four spigots 14, which are then rotated and/or lowered into the two waiting partially formed containers 42. The anvil 20 moves forward to locate the screw cap arrangements 40 in the holes 44 in the partially formed containers 42, with a flange of the screw cap arrangements 40 remaining inside the partially formed containers 42. The ultrasonic horn 46 is then brought into contact with the screw cap arrangements 40 and the partially formed containers 42 and pressure is applied on both sides by the anvil 20 and the horn 46 in order to complete the sealing process using pressure in addition to the ultrasound.

Once the sealing has been completed, the horn 46 is withdrawn, as is the anvil 20 which is then raised and/or rotated to exit the interior of the partially formed containers 42 which are then moved away to another station in a larger form-fill-seal machine. The entire process of fitting the screw cap arrangements 40 to the partially formed containers 42 takes under a second. This process continues continually with two new screw cap arrangements 40 being loaded onto the unused spigots 14 of the anvil 20 and then brought into position inside the partially formed containers 42 and sealed into position by the ultrasonic horn 46 with pressure from the horn 46 and the anvil 20.

Figure 2:
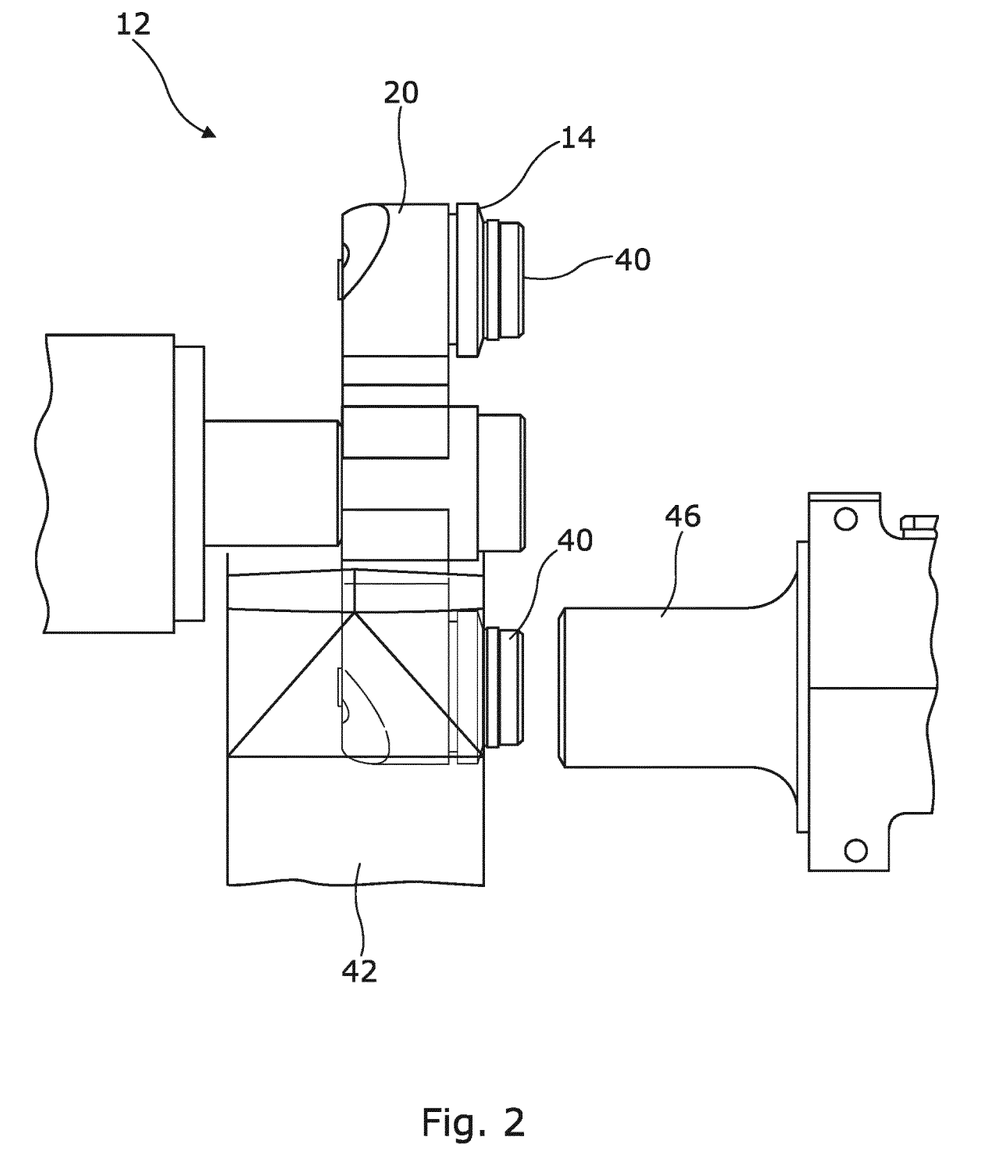
FIG. 2 is a side view of the cap applicator unit.

FIG. 2 shows a side view of the cap applicator unit 12. The anvil 20 has been rotated and/or lowered into the top of the partially formed containers 42 and moved forwards so that the screw cap arrangements 40 are located within the holes 44 of the partially formed containers 42. The horn 46 is ready to move forward and perform the ultrasonic welding while pressure is applied (usually by the horn 46 alone). In order to achieve the best possible seal, the distance between the anvil 20 and the horn 46 has to be adjusted, the contact pressure has to be optimised (which is usually in the range of 1000 to 2000 N) and the anvil 20 and the horn 46 have to be in alignment.

As can be seen from this Figure, the continual application of pressure by the horn 46 onto the anvil 20 will put enormous strain on the arm of the anvil 20. The operation of the components will result in pressure being applied, for example for half a second in every second. Over time this will tend to lead very slightly to deformation of the anvil 20 and this will increase the risk that the anvil 20 and the horn 46 are not in parallel alignment when they are brought together. If the alignment between these parts is not correct, the possibility of unreliable seal of the screw cap arrangements 40 to the partially formed container 42 is possible, which is extremely undesirable.

Figure 3:
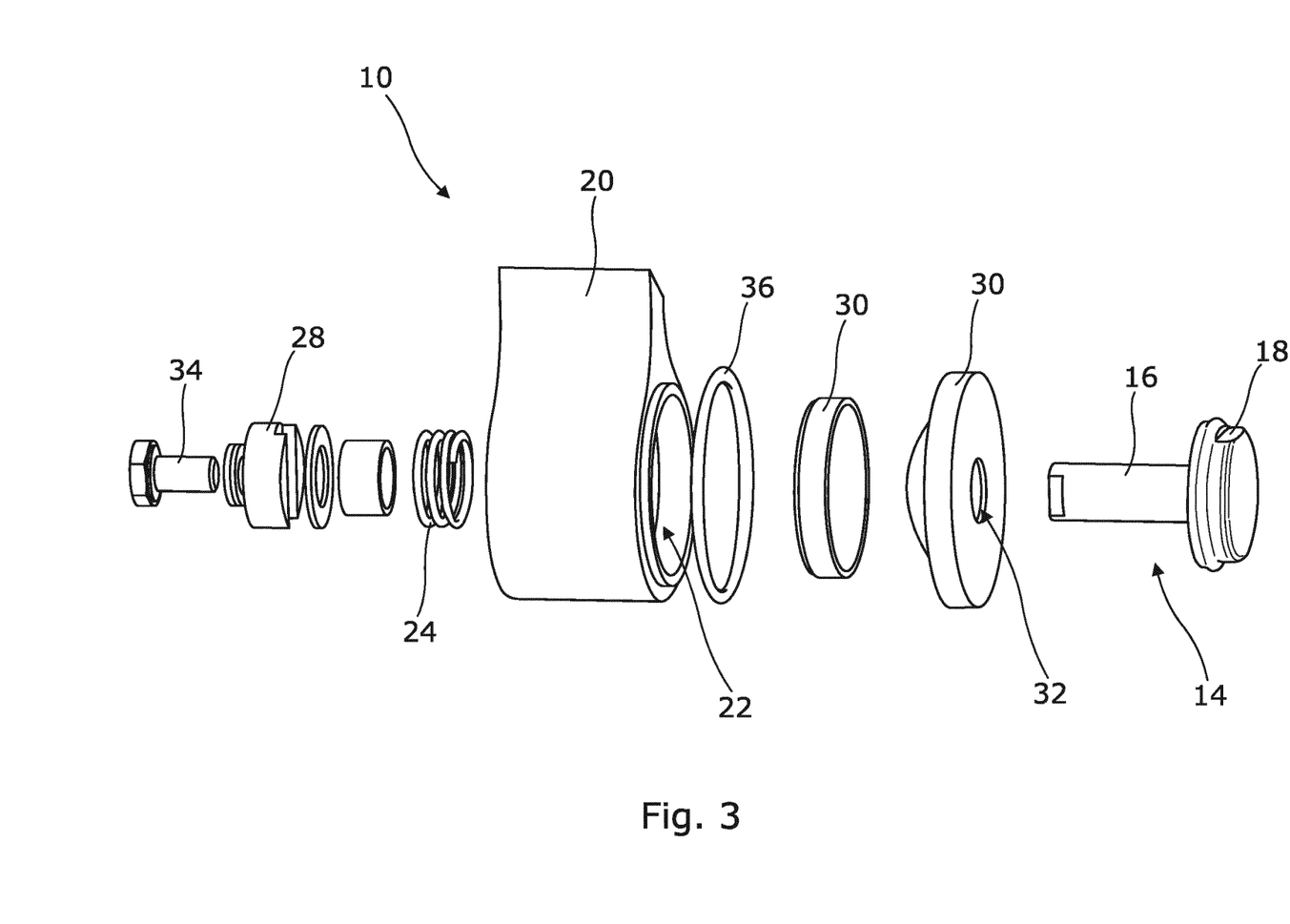
FIG. 3 is an exploded side view of components of apparatus for use in the unit of FIGS. 1 and 2, FIGS. 4a and 4b are cross-sections through the apparatus of FIG. 3.

FIG. 3 shows more detail of the components that make up the anvil 20 and spigot 14. The apparatus 10 comprises the spigot 14 which has an elongate body 16 and a head 18 connected to one end of the elongate body 16, and the anvil 20 which is provided with a hole 22 therein, where the elongate body 16 of the spigot 14 is mounted in the hole 22 of the anvil 20 when the apparatus 10 is in use. The apparatus 10 also further comprises a tensioning device 24 (in the preferred embodiment this is a spring) which in use is arranged to provide a force tensioning the spigot 14 against the anvil 20.

In use, a locking ring 28 is mounted on the elongate body 16 of the spigot 14 at the opposite end of the elongate body 16 to the head 18 of the spigot 14, with the tensioning device 24 is arranged to provide its tensioning force through the locking ring 28. A screw 34 holds the locking ring 28 in place. The apparatus 10 also comprises a two-part spherical bearing 30 provided with a hole 32 therein, where in use, the elongate body 16 of the spigot 14 mounted in the hole 32 of the two-part spherical bearing 30 and the two-part spherical bearing 30 engages the anvil 20 on one side and the head 18 of the spigot 14 on the other side. A compressible O-ring 36 is provided that is located between the spherical bearing 30 and the anvil 20.

The apparatus 10 is configured so that the size of the hole 22 of the anvil 20 is sufficiently greater than the size of the elongate body 16 of the spigot 14 to permit angular movement of the spigot 14 relative to the anvil 20. The anvil 20 and spigot 14 arrangement provide automatic correction of any misalignment between the anvil 20 and the horn 46 since the hole 22 in the anvil 20 through which the spigot 14 is located is sufficiently greater in size than the elongate body 16 of the spigot 14, which therefore permits angular movement of the spigot 14 relative to the anvil 20. The permitted angular movement may be very small, for example only up to 2 degrees, but this range of movement is sufficient to provide the necessary level of correction needed to compensate for any misalignment.

Figure 4A:
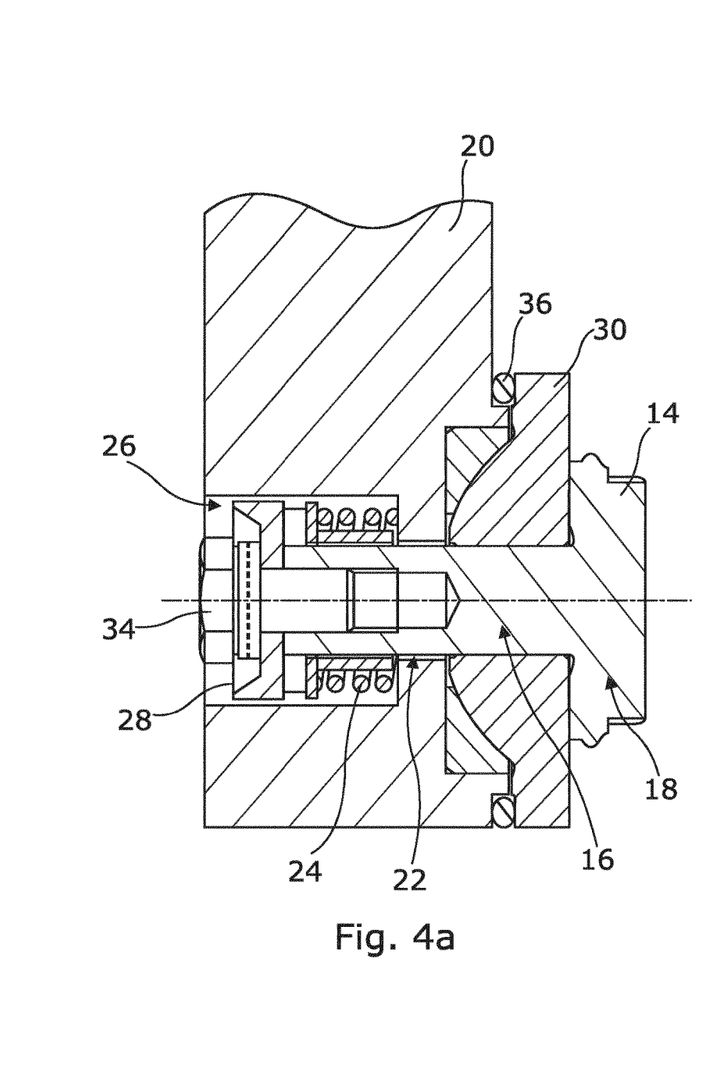
Figure 4B:
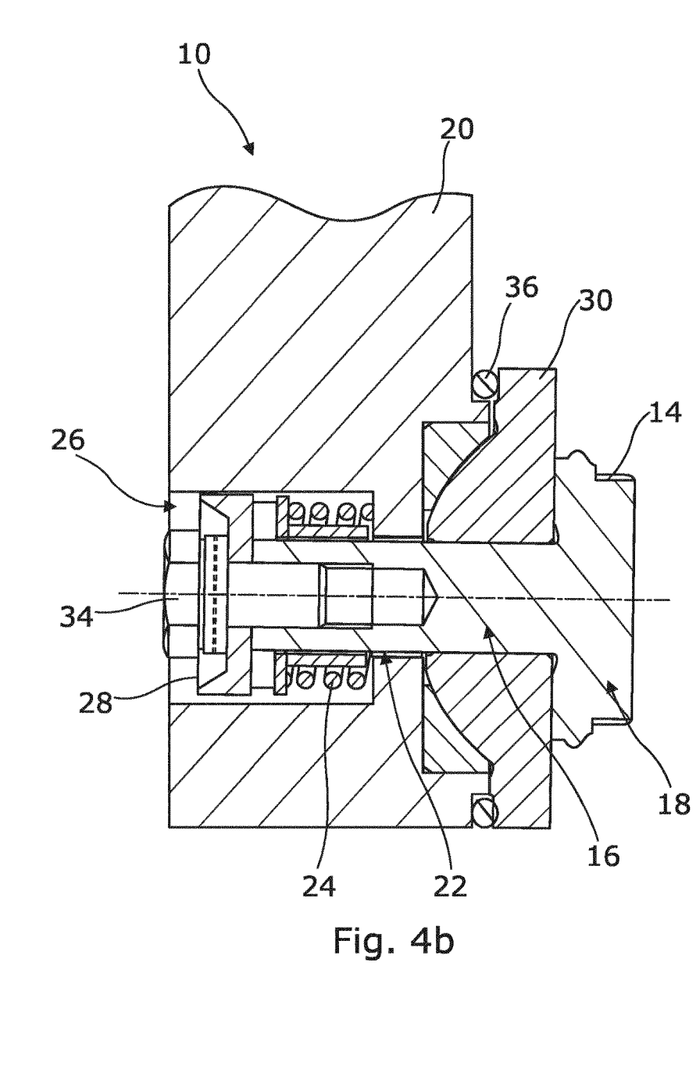

A cross-section through the apparatus 10 in use is shown in FIGS. 4a and 4b. As can be seen in FIGS. 4a and 4b, the anvil 20 is further provided with a cavity 26 connected to and in longitudinal alignment with the hole 22 in the anvil 20, the cavity 26 containing the tensioning device 24 (the spring 24). The screw 34 engages with an internal thread within the body 16 of the spigot 14. Turning the screw 34 forces the locking ring 28 into contact with the spring 24 and as the screw 34 is tightened the spring 24 is compressed and thereby provides the tensioning force between the spigot 14 and the anvil 20.

FIG. 4a shows the apparatus 10 in its normal position, with the spigot 14 in alignment with the anvil 20. This provides an excellent working sealing position with respect to the horn 46, if the horn 46 and anvil 20 are in correct alignment, with their respective faces in parallel. However, should there be any deviation in the alignment between the anvil 20 and the horn 46, then the structure of the apparatus 10 is able to self-correct for this lack of alignment. This correction is delivered by the ability of the spigot 14 to be able to move angularly with respect to the anvil 20, which is shown in FIG. 4b, in the maximum movement possible (which is only a 2 degrees movement).

If there is any misalignment between the horn 46 and the anvil 20, then as these two components of the cap applicator unit 12 are brought together, the effect of the large pressure being exerted on these components causes the spigot 14 to move inside the anvil 20, thereby bringing the head 18 of the spigot 14 into alignment with the horn 46, even if the anvil 20 is out of alignment. The "floating" spigot 14 is able to compensate for small errors in the alignment between the anvil 20 and the horn 46. The force generated between the anvil 20 and the horn 46 overcomes the tension provided by the spring 24 and this allows the spigot 14 to move inside the anvil 20.

Figure 5:
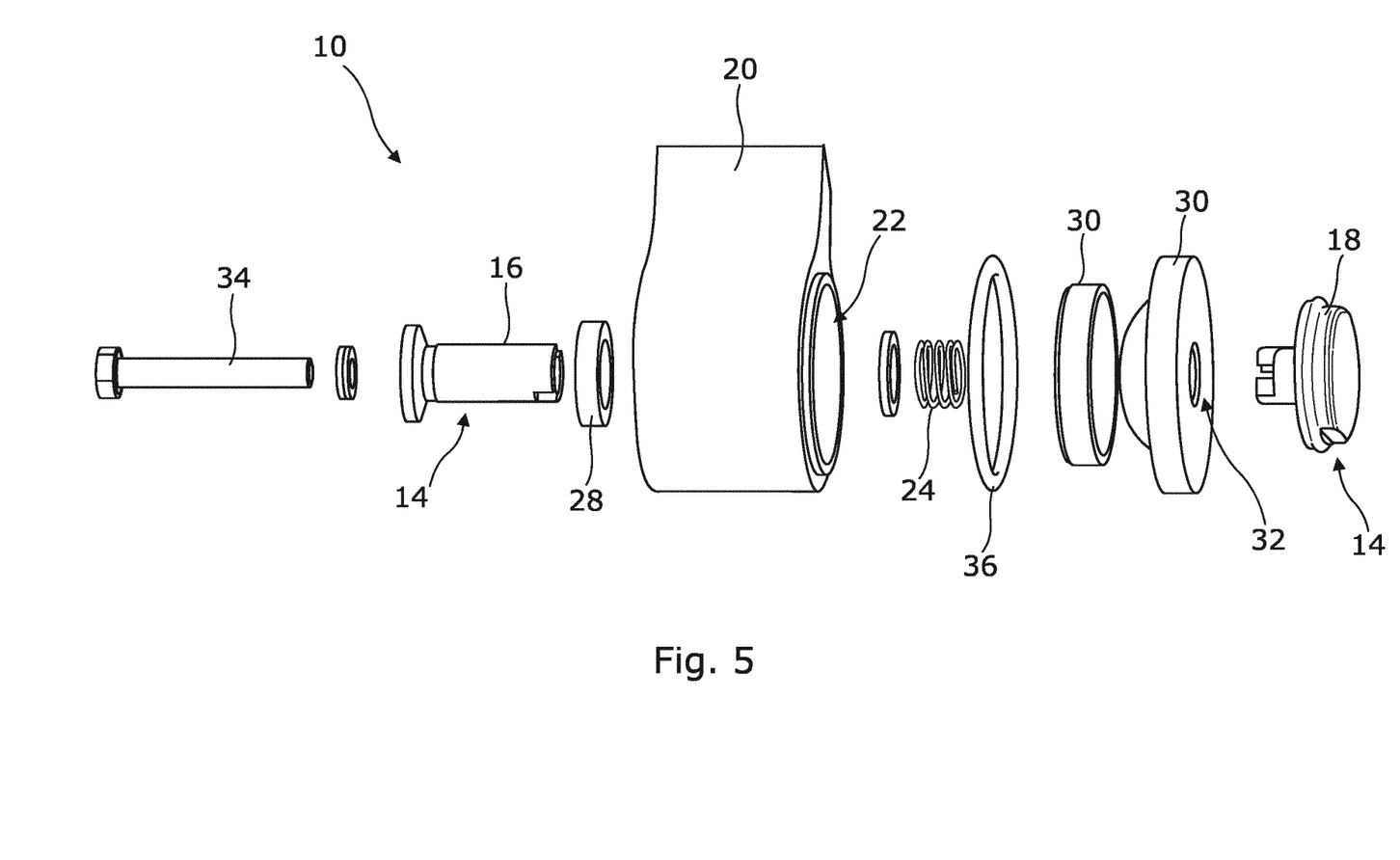
FIG. 5 is an exploded side view of a second embodiment of components of apparatus for use in the unit of FIGS. 1 and 2, and FIGS. 6a and 6b are cross-sections through the apparatus of FIG. 5.

FIG. 5 shows a second embodiment of the apparatus 10. This embodiment is very similar to that of the first embodiment and has the same main components, being the anvil 20, the spigot 14 located in a hole 22 in the anvil 20 and a tensioning device 24 (a spring 24) which creates a tension force between the spigot 14 and the anvil 20. The spigot 14 is of two part construction, with the elongate body 16 of the spigot 14 connected to the head 18 of the spigot by the central screw 34. The spring 14 is located forward of the hole 22 within the anvil 20, whereas in the first embodiment, the spring 14 is located behind the hole 22.

Figure 6A:
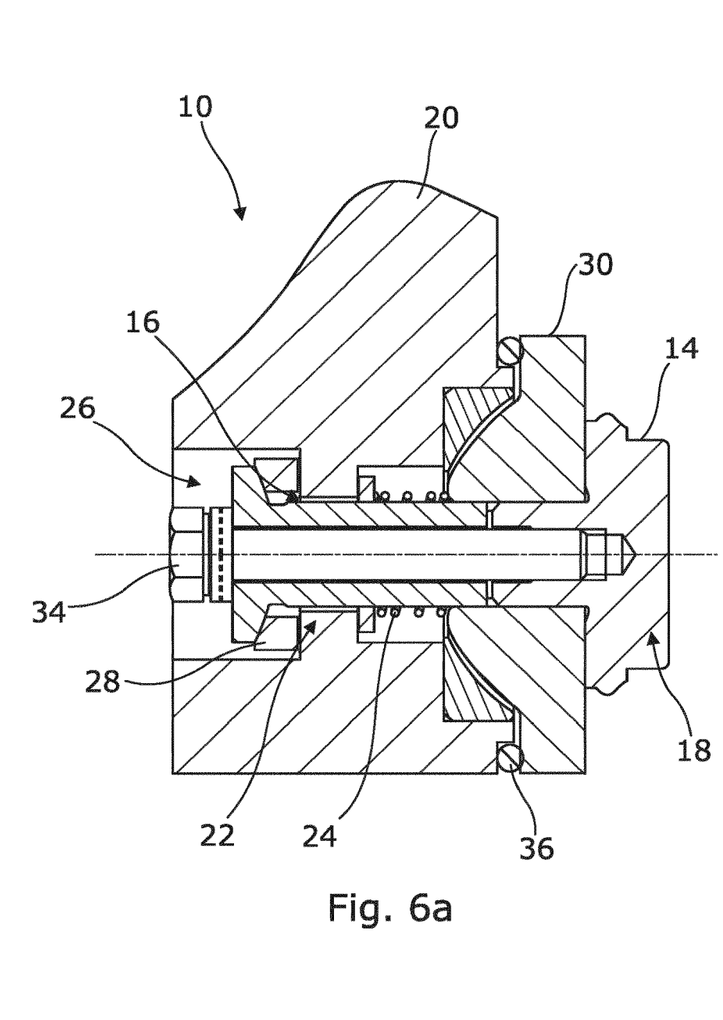
Figure 6B:
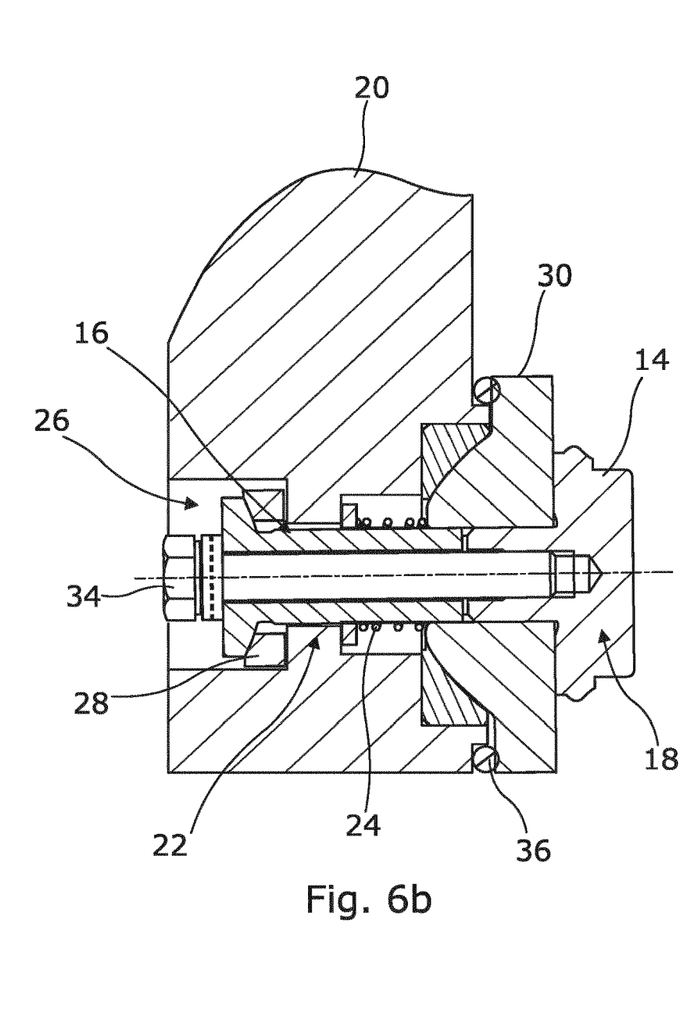

Cross-sections through the second embodiment of the apparatus 10 are shown in FIG. 6. As before, FIG. 6a shows the apparatus 10 in its normal working condition, assuming that there is no misalignment between the anvil 20 and the horn 46. FIG. 6b shows the maximum movement of the spigot 14 within the anvil 20, which will be caused by any misalignment between the anvil 20 and horn 46 once these two components are brought together. The pressure created as the sealing takes place causes the spigot 14 to move angularly within the anvil 20, thereby correcting any mis-alignment between the anvil 20 and the horn 46.

The self-aligning spigot 14 is able to compensate for different angular errors. In use the spigot 14 and the horn 46 will be parallel. Angle errors are compensated and a self-aligning "floating" spigot 14 adapts automatically to the existing geometry of the components of the unit 12. The set-up time of the unit 12 is reduced and no mistakes will occur in the set-up, since the self-correction will always mitigate any mis-alignment. Better and more consistent welding results from the self-correcting spigot 14, since an distribution of force between the horn 46 and the screw cap arrangement 40 will be delivered.

Figure 7:
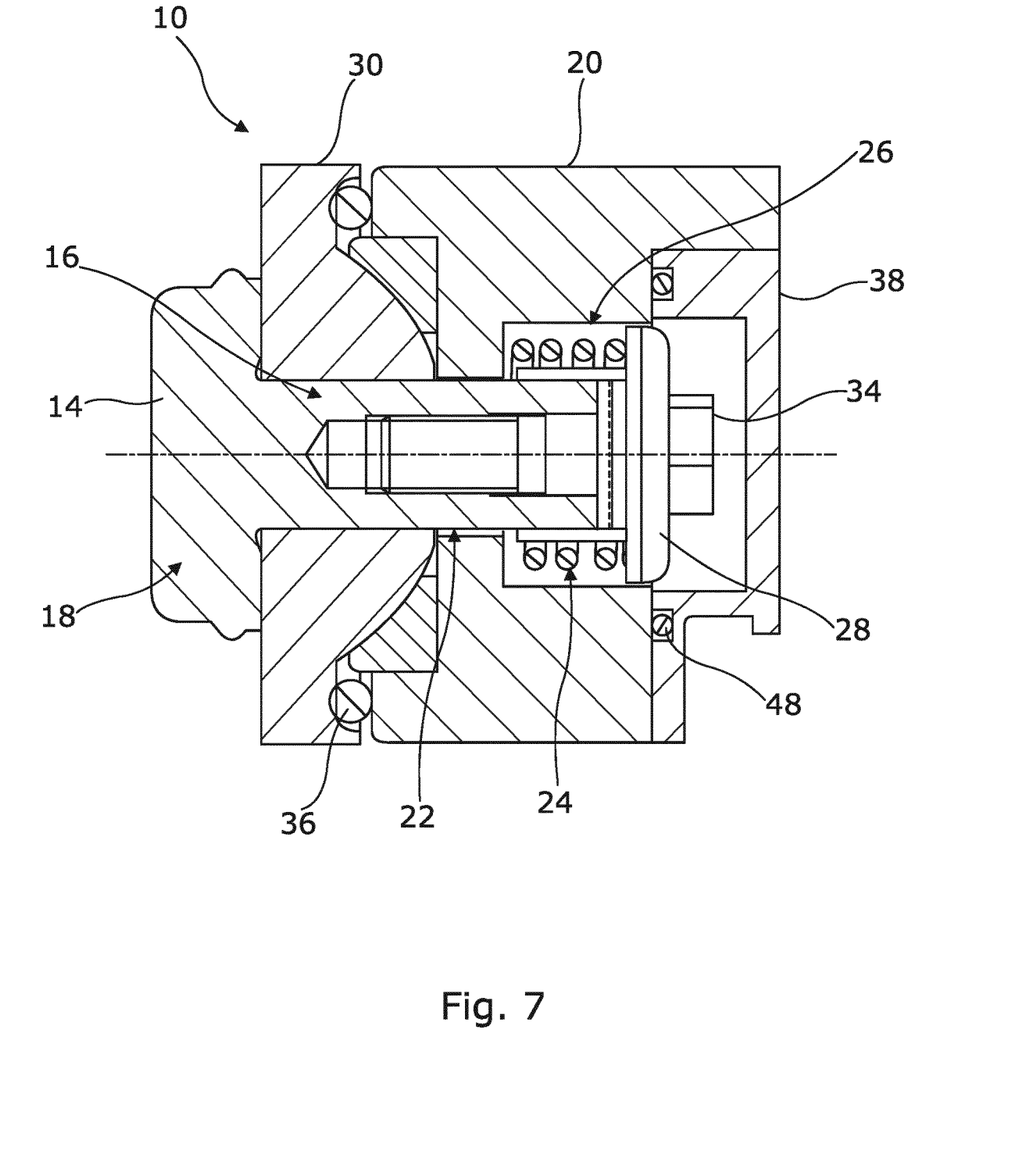
FIGS. 7 to 13 show further embodiments of the apparatus.
Figure 8:
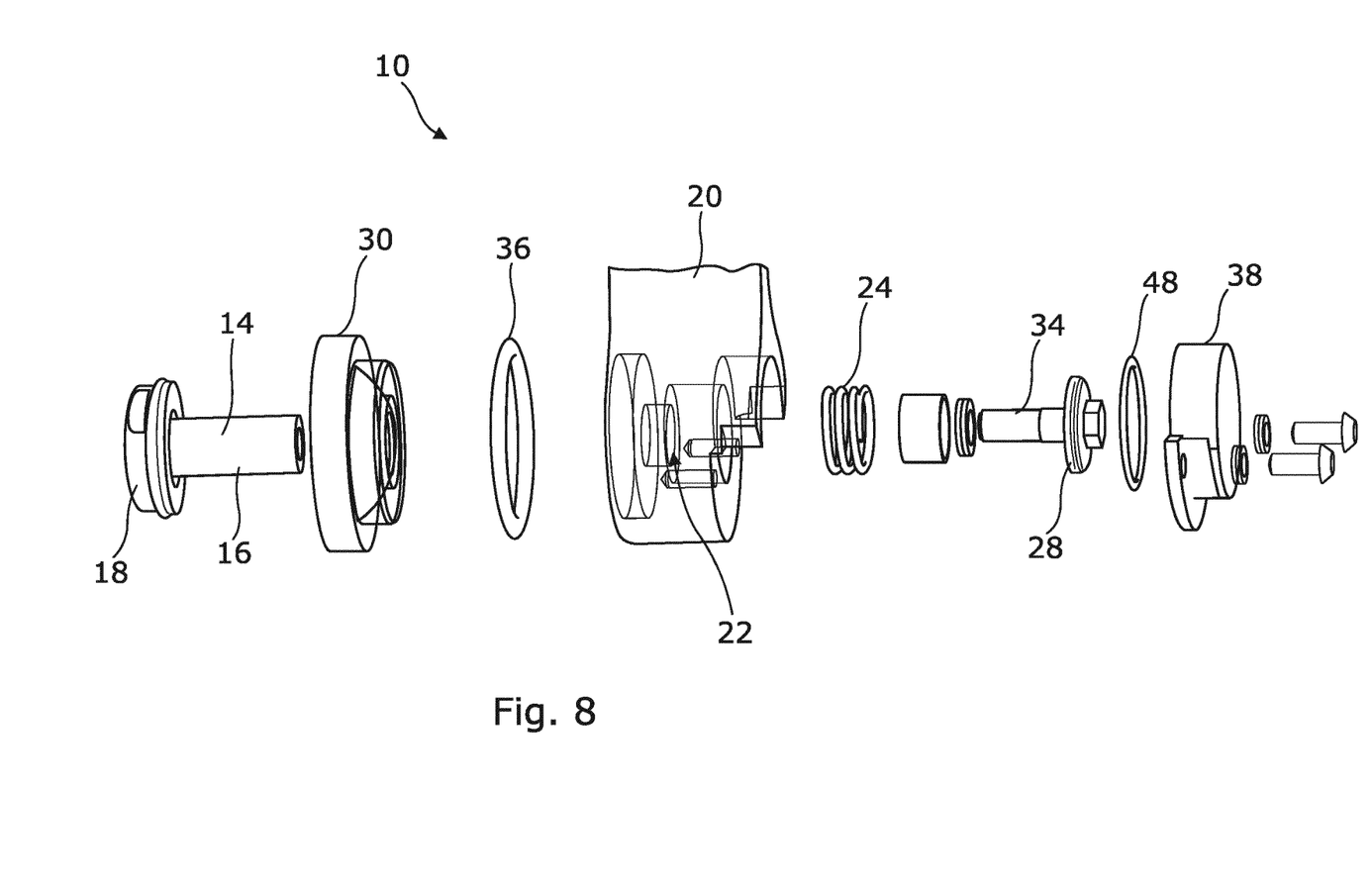

FIGS. 7 and 8 show a further embodiment of the apparatus 10. FIG. 7 shows a cross-section through the apparatus 10 where the spigot 14 and the anvil 20 are in a parallel position, with the longitudinal axes of the spigot 14 and the anvil 20 being parallel. FIG. 8 shows an exploded view of the components of this embodiment of the apparatus 10. This embodiment principally differs from the previous embodiments by the provision of an O-ring 36, which is located between and in contact with the spherical bearing 30 and the anvil 20. The O-ring 36 is compressible and has two main functions. Firstly, the O-ring 36 is a sealing device and provides sealing between the anvil 20 and the spherical bearing 30 and secondly, the O-ring 36 also provides a force tensioning the spigot 14 against the anvil 20 in addition to the spring 24. In fact the force provided by the O-ring 36 is against that of the spring 24, but both provide a force tensioning the spigot 14 against the anvil 20. A cap 38 is also provided to seal the end of the screw 34 and a second O-ring 48 is provided between the cap 38 and the anvil 20. The O-ring 36 could be replaced by a different sealing device such as a quad-ring or a compressible cylinder, either of which could be used to provide the twin functions of sealing and provision of the tensioning force.

Figure 9:
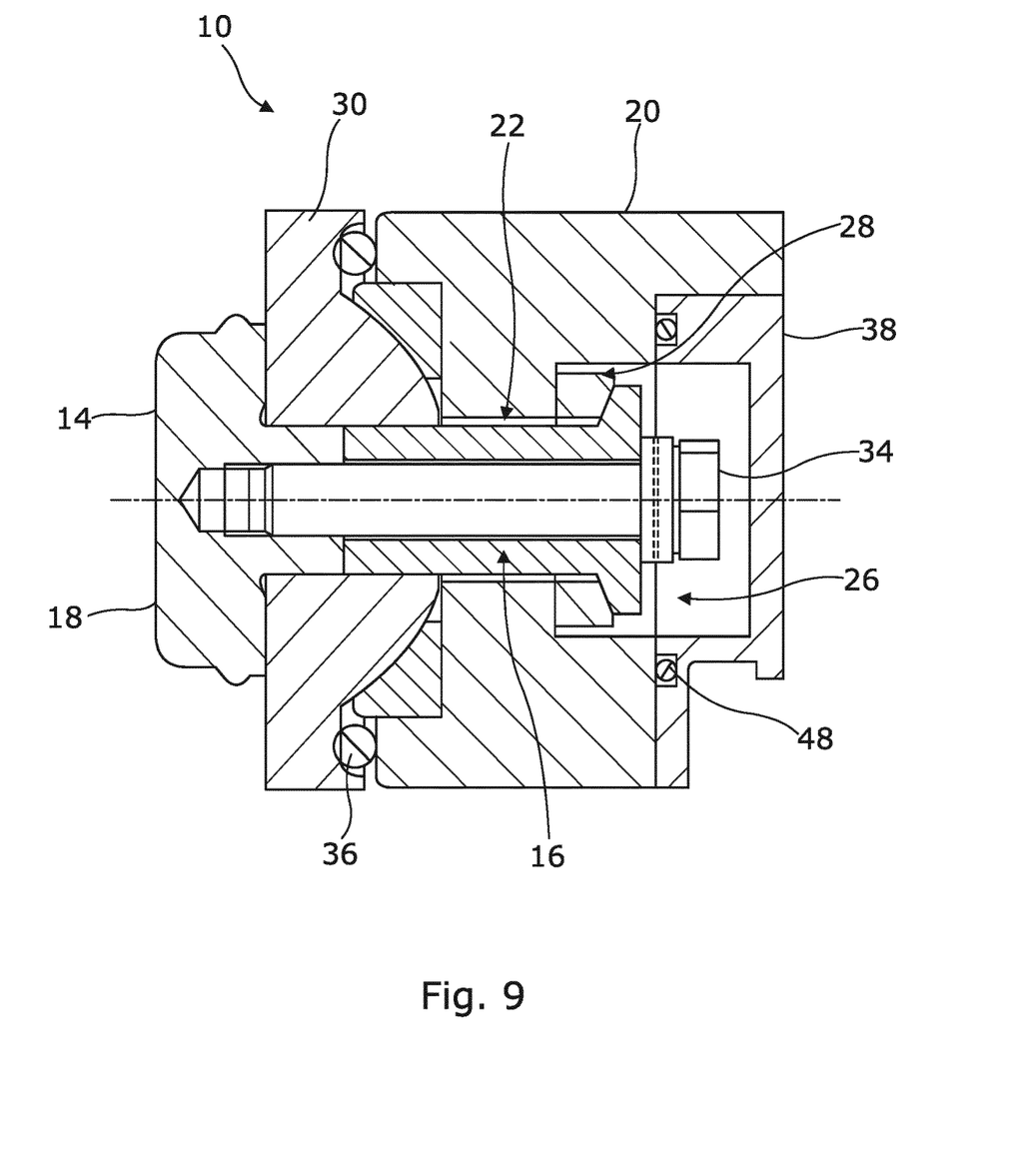
Figure 10:
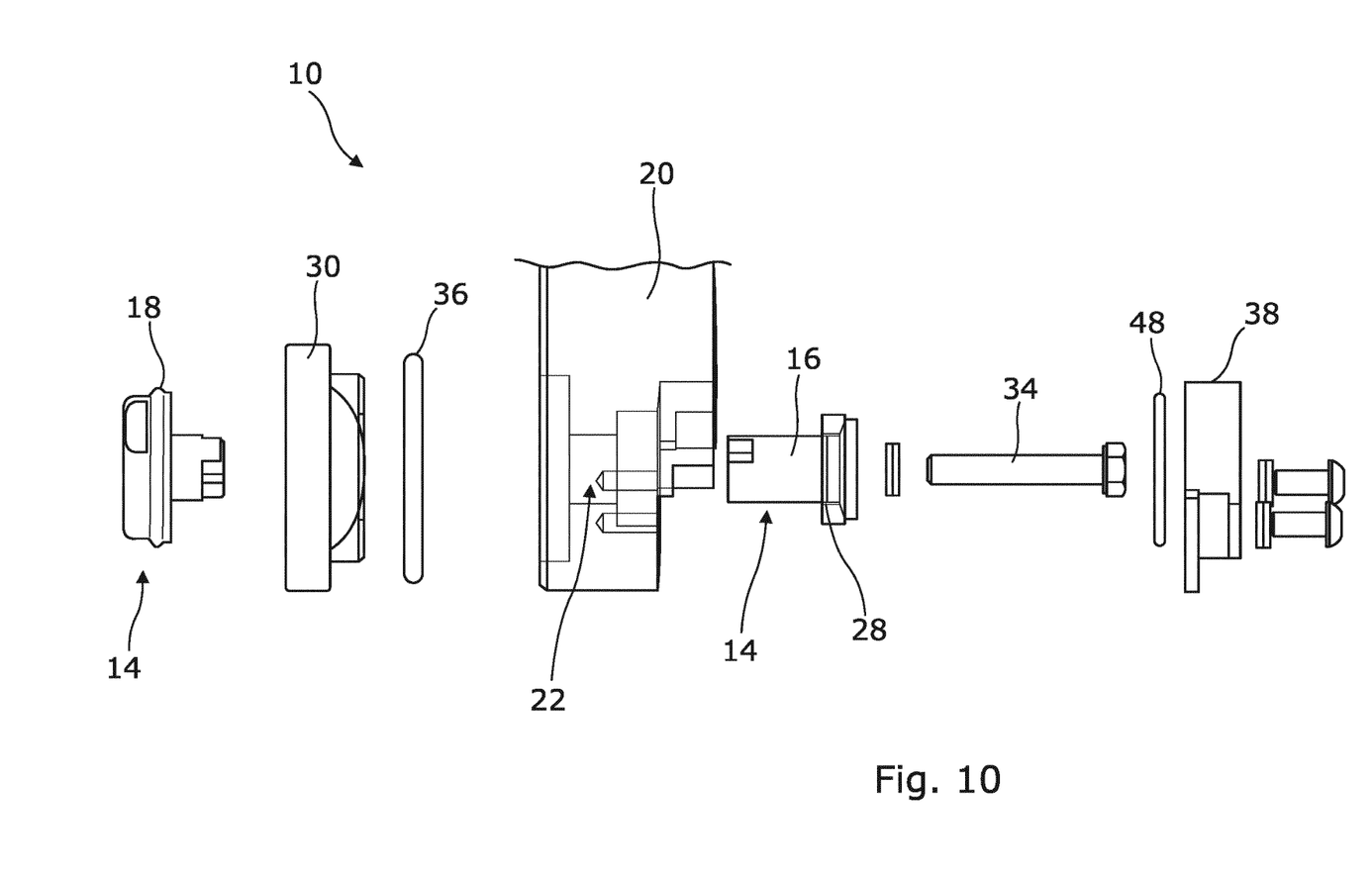

FIGS. 9 and 10 show a yet further embodiment of the apparatus 10. This version differs from the embodiment shown in FIGS. 7 and 8 principally in that the spring 24 is not present. This means that the sole tensioning device in the apparatus 10 is the O-ring 36, which is under a small amount of compression and therefore tends to push the spherical bearing 30 (and hence the spigot 14) away from the anvil 20. The spigot 14 shown in this embodiment is also in the two part form, with a separate head 18 and body 16. The correction provided by the apparatus 10 is achieved by the movement of the spigot 14 within the anvil 20, with the O-ring 36 able to be compressed to allow for angular movement of the spigot 14 relative to the anvil 20.

Figure 11:
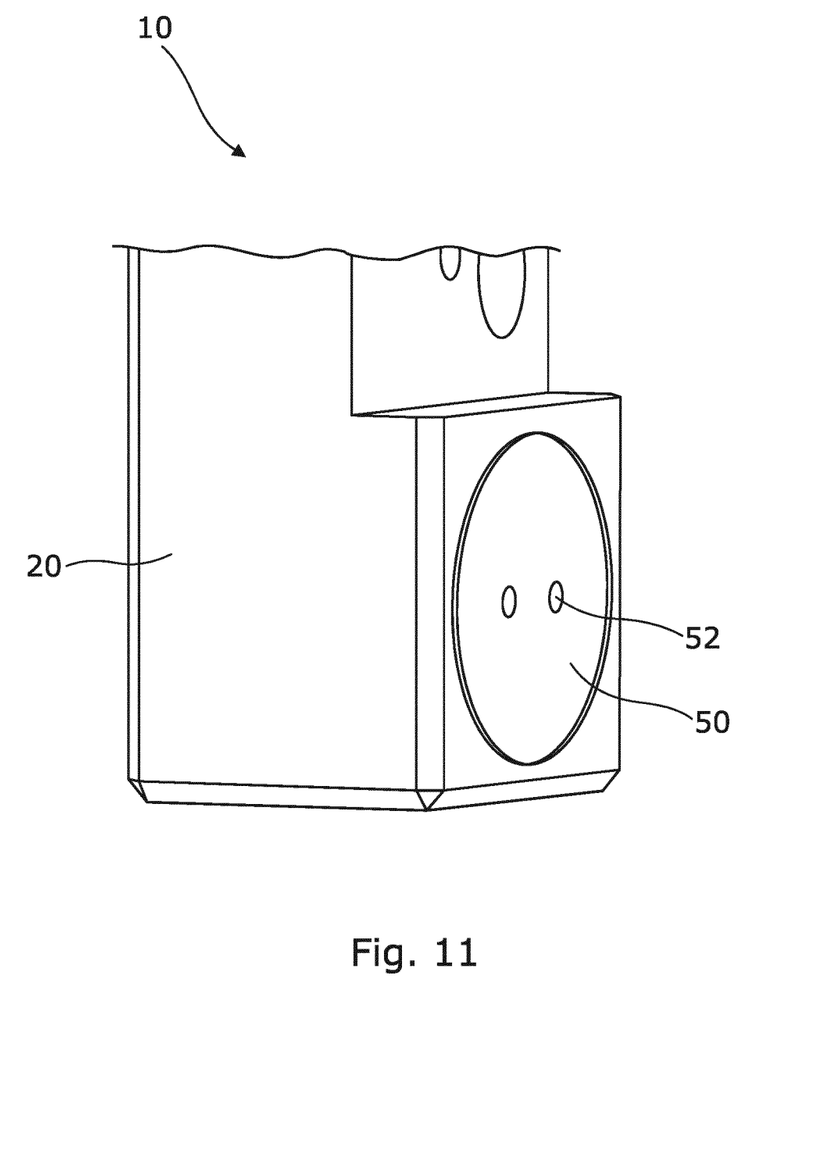
Figure 12:
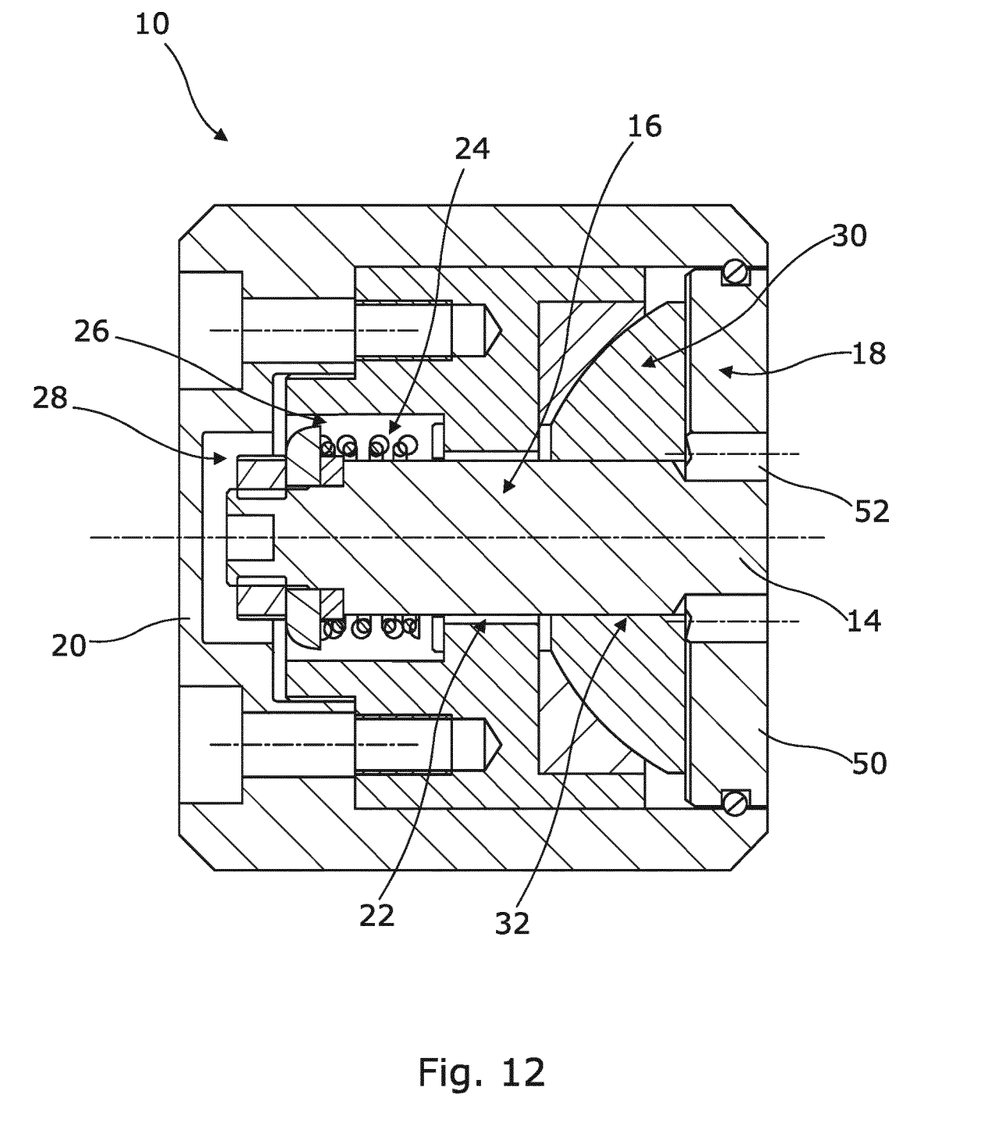
Figure 13:
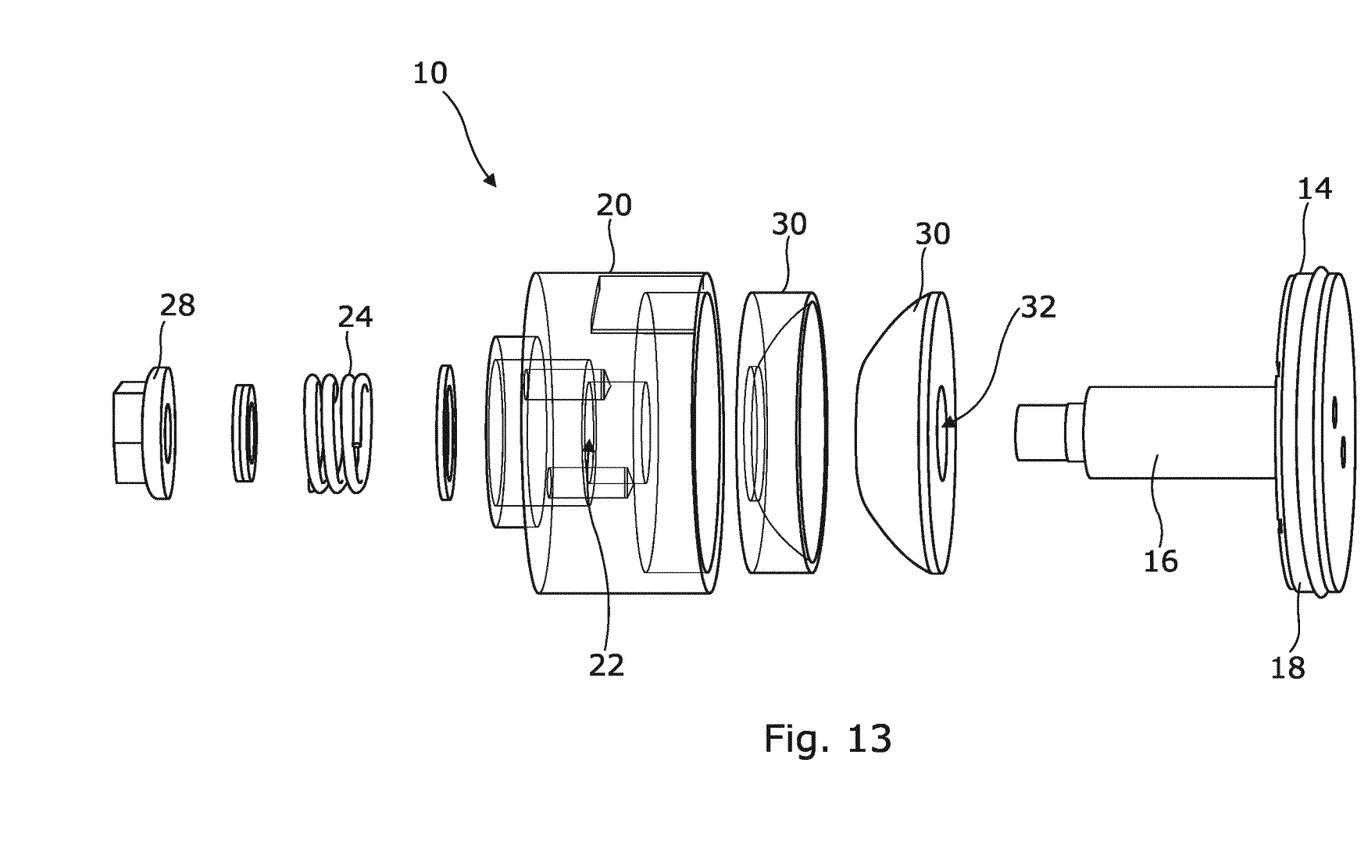

FIGS. 11, 12 and 13 show a yet further embodiment of the apparatus 10. This version differs from previous embodiments in that the spigot 14 does not protrude from the surface of the anvil 20. The external face 50 of the spigot 14 is flush with the surface of the anvil 20. The spigot 14 is provided with holes 52 in the face 50. As in all embodiments, the size of the hole 22 in the anvil 20 is sufficiently greater than the size of the elongate body 16 of the spigot 14 to permit angular movement of the spigot 14 relative to the anvil 20 and the apparatus 10 includes a tensioning device 24 (a spring) arranged to provide a force tensioning the spigot 14 against the anvil 20.

The apparatus 10 of FIGS. 11 to 13 works by providing an internal vacuum that can be used to suck a screw cap arrangement 40 onto the face 50 of the spigot 14. In use, the anvil 20, with the screw cap arrangement 40 fixed to the face 50 of the spigot 14 is brought into contact with the horn 46 of the cap applicator unit 12 and the spigot 14 is able to move relative to the anvil 20 to correct any slight misalignment between the horn 46 and the anvil 20. The apparatus 10 shown in these Figures can also be used in cap applicator units that do not have the screw cap arrangement 40 introduced from the interior of the partially formed container 42. In such unit, the screw cap arrangement 40 is mounted on the horn 46 rather than the spigot 14 and remains external to the partially formed container 42. The anvil 20 and spigot 14 arrangement shown in FIGS. 11 to 13 can be used internally within the partially formed container 42 and are still able to provide correction for any misalignment between the horn 46 and the anvil 20.

The invention claimed is:

1. An apparatus for use in a cap applicator unit, the apparatus comprising:
   a spigot comprising an elongate body and a head connected to one end of the elongate body, and
   an anvil provided with a hole therein, the elongate body of the spigot mounted in the hole of the anvil,
   wherein the hole of the anvil and the elongate body of the spigot permit angular movement of the spigot relative to the anvil and the apparatus further comprises a first tensioning device arranged to provide a force tensioning the spigot against the anvil and a two-part spherical bearing provided with a hole therein, the elongate body of the spigot mounted in the hole of the two-part spherical bearing and the two-part spherical bearing engaging the anvil on one side and the head of the spigot on the other side.

2. The apparatus according to claim 1, wherein the anvil is further provided with a cavity connected to and in longitudinal alignment with the hole in the anvil, the cavity containing the first tensioning device.

3. The apparatus according to claim 1, and further comprising a locking ring mounted on the elongate body of the spigot at the opposite end of the elongate body to the head of the spigot, wherein the first tensioning device is arranged to provide its tensioning force through the locking ring.

4. The apparatus according to claim 1, wherein the spigot is of two part construction, with the elongate body of the spigot connected to the head of the spigot by a central screw.

5. The apparatus according to claim 1, wherein the first tensioning device comprises either a spring or a compressible cylinder.

6. The apparatus according to claim 1, wherein the first tensioning device is in a form of a sealing device comprising one of a compressible O-ring, a quad-ring or a compressible cylinder.

7. The apparatus-according to claim 1, further comprising a second tensioning device arranged to provide a force tensioning the spigot against the anvil.

8. A method of operating the apparatus according to claim 1 the method comprising:
   locating a screw cap arrangement adjacent to a partially formed container,
   locating the anvil adjacent to the screw cap arrangement, and
   applying pressure from a horn onto the screw cap arrangement and the partially formed container to seal the screw cap arrangement to the partially formed container, whereby the spigot moves angularly relative to the anvil so that the head of the spigot is in alignment with the horn.

9. The method according to claim 8, and further comprising mounting the screw cap arrangement on the head of the spigot and moving the anvil relative to the partially formed container to locate the screw cap arrangement through a hole in the partially formed container.

* * * * *